United States Patent [19]
Smith et al.

[11] Patent Number: 6,067,423
[45] Date of Patent: May 23, 2000

[54] CAMERA WITH INDICATOR TO WARN OF UNINTENDED SHUTTER OPENING SUCH AS WHEN CAMERA DROPPED OR JARRED

[75] Inventors: Stephen J. Smith, Shortsville; James D. Boyd, Rochester; Michael P. Cramer, Victor, all of N.Y.

[73] Assignee: Eastman Kodak Company, Rochester, N.Y.

[21] Appl. No.: 09/267,053

[22] Filed: Mar. 12, 1999

[51] Int. Cl.⁷ .............................. G03B 7/02; G03B 17/18
[52] U.S. Cl. ............................................................ 396/281
[58] Field of Search ........................... 396/281, 287–292, 396/296, 452

[56] References Cited

U.S. PATENT DOCUMENTS

| | | |
|---|---|---|
| 3,358,572 | 12/1967 | Steisslinger . |
| 3,909,568 | 9/1975 | Greenhut . |
| 4,135,797 | 1/1979 | Ohmura et al. . |
| 4,313,658 | 2/1982 | Sugiura et al. . |
| 4,403,844 | 9/1983 | Namai . |
| 4,982,684 | 1/1991 | Rubey . |
| 5,400,868 | 3/1995 | Ellis et al. . |
| 5,528,228 | 6/1996 | Wilk . |

*Primary Examiner*—Howard B. Blankenship
*Attorney, Agent, or Firm*—Roger A. Fields

[57] ABSTRACT

A camera comprising an aperture through which ambient light is passed to cause a film exposure, at least one shutter blade supported for opening movement to uncover the aperture to permit ambient light to pass through the aperture and for closing movement to re-cover the aperture and susceptible of being moved open accidentally such as when the camera is dropped or jarred, and a shutter release button manually depressible to initiate opening movement of the shutter blade, is characterized in that an indicator is activatable to provide a warning the shutter blade has been moved open without the shutter release button having been manually depressed, whereby the warning indicates the shutter blade has been moved open accidentally such as when the camera is dropped or jarred.

8 Claims, 8 Drawing Sheets

CAMERA WITH INDICATOR TO WARN OF UNINTENDED SHUTTER OPENING SUCH AS WHEN CAMERA DROPPED OR JARRED

FIELD OF THE INVENTION

The invention relates generally to the field of photography, and in particular to cameras. More specifically, the invention relates to a camera with an indicator to warn of unintended shutter opening such as when the camera is dropped or jarred.

BACKGROUND OF THE INVENTION

It is conventional for a camera to have an aperture through which ambient light is passed to cause a film exposure, at least one shutter blade supported for opening movement to uncover the aperture to permit ambient light to pass through the aperture and for closing movement to re-cover the aperture, and a shutter release button manually depressible to initiate opening movement of said shutter blade.

Problem

In a relatively inexpensive simple camera, for example a one-time-use or disposable camera, the shutter blade is susceptible of being moved open accidentally, i.e. without the shutter release button having been manually depressed. This can occur when the camera is dropped or jarred and causes an unintended exposure. If there is no indication to warn the photographer of the unintended exposure, the photographer may make the next exposure over the unintended exposure, in which case there is a double or ruined exposure.

SUMMARY OF THE INVENTION

A camera comprising an aperture through which ambient light is passed to cause a film exposure, at least one shutter blade supported for opening movement to uncover the aperture to permit ambient light to pass through the aperture and for closing movement to re-cover the aperture and susceptible of being moved open accidentally such as when the camera is dropped or jarred, and a shutter release button manually depressible to initiate opening movement of the shutter blade, is characterized in that:

an indicator is activatable to provide a warning the shutter blade has been moved open without the shutter release button having been manually depressed, whereby the warning indicates the shutter blade has been moved open accidentally such as when the camera is dropped or jarred.

DETAILED DESCRIPTION OF THE INVENTION

The invention is disclosed as being embodied preferably in a relatively inexpensive simple camera such as a one-time-use or disposable camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 8:
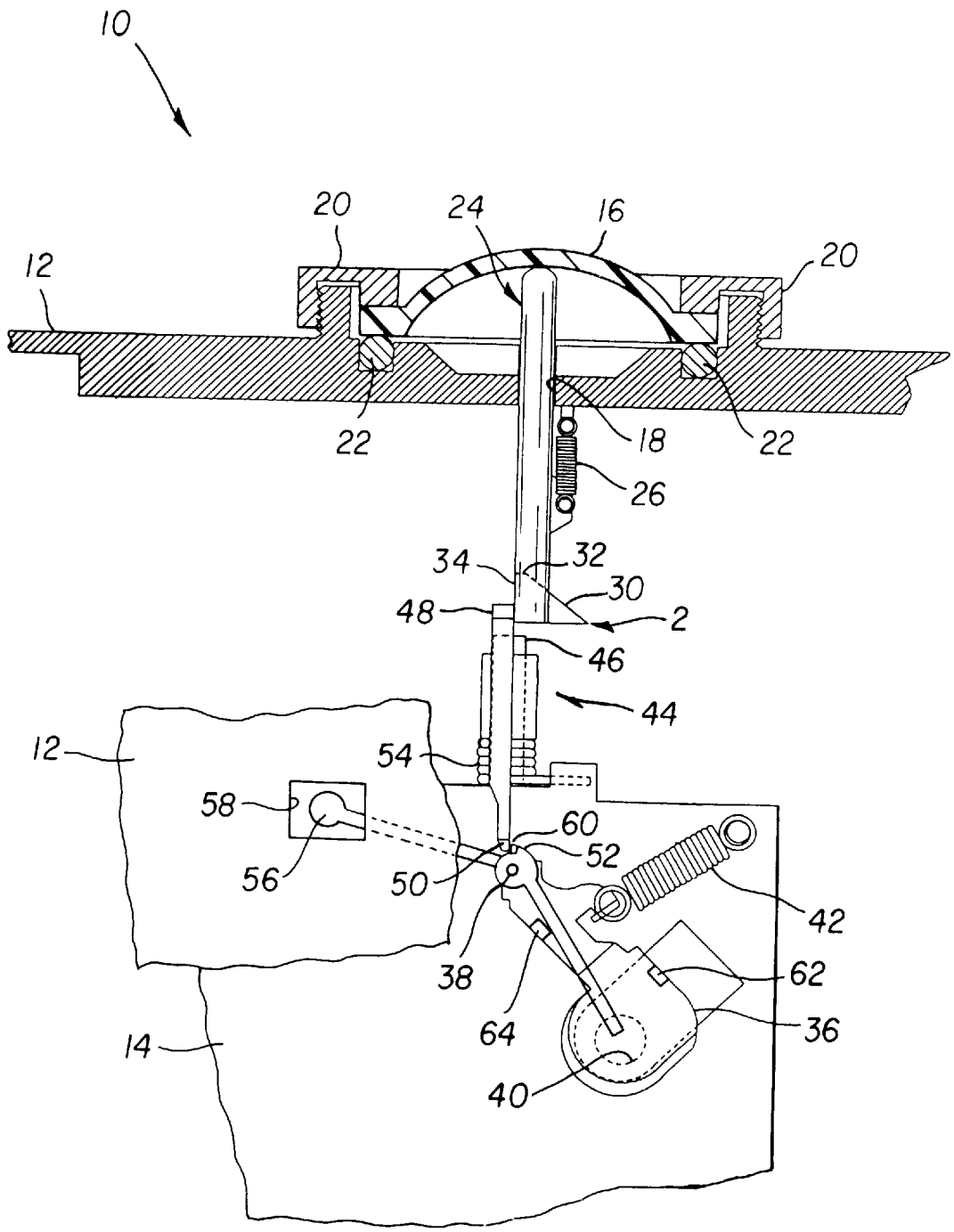
FIG. 8 is a front elevation view similar to FIG. 7, but in which the shutter blade is moved closed and the indicator is positioned at a window to be seen.

Referring now to the drawings, FIGS. 1–8 show a portion of a camera 10 having a front and top cover part 12 that is located in front and on top of a main body part 14. A dome-shaped shutter release button 16 is held in place over a top opening 18 in the front and top cover part 12 by a retaining ring 20 that is thread-connected to the front and top cover part. A resilient rubber o-ring 22 provides a seal between the shutter release button 16 and the front and top cover part 12. A plunger rod 24 is positioned beneath the shutter release button 16 and longitudinally extends through the top opening 18. A helical tension return spring 26 interconnects the front and top cover part 12 and the plunger rod 24 to continuously urge the plunger rod upwards through the top opening 18 in FIG. 1 and against the inside of the shutter release button 16. The plunger rod 24 includes an integral end projection 28 that has an incline or ramp 30, a top flat or plateau 32, and a vertical retainer wall 34. See FIGS. 1 and 2. A shutter blade 36 is pivotally connected at a pivot pin 38 to the main body part 14 for pivotal opening movement clockwise in FIG. 3 about the pivot pin, i.e. shutter opening, to uncover an aperture 40 in the main body part in order to expose a filmstrip (not shown) in the camera 10, and for pivotal closing movement counter-clockwise in FIG. 5 about the pivot pin, i.e. shutter closing, to re-cover the aperture. A helical tension return or closing spring 42 continuously urges the shutter blade 36 to re-cover the aperture 40. A cylinder-shaped actuator 44 is rotatable about a fixed support shaft 46 and has a top end flange 48 positioned against the vertical retainer wall 34 on the end projection 28 of the plunger 24 and a bottom end flange 50 positioned against a protuberance 52 on the shutter blade 36 in FIGS. 1 and 2. A helical torsion spring 54 continuously urges the actuator 44 to rotate counterclockwise in FIGS. 1 and 2 about the shaft 46, but the actuator is prevented from being rotated counter-clockwise because its top end flange 48 is blocked by the vertical retainer wall 34 on the end projection 28 of the plunger rod 24. An indicator 56 is pivotally connected at the pivot pin 38 to the main body part 14 for pivotal movement clockwise in FIG. 3 and counter-clockwise in FIGS. 5 and 6. A front window 58 in the front and top cover part 12 is positioned to view the indicator 56 at the window as shown in FIG. 8.

Figure 3:
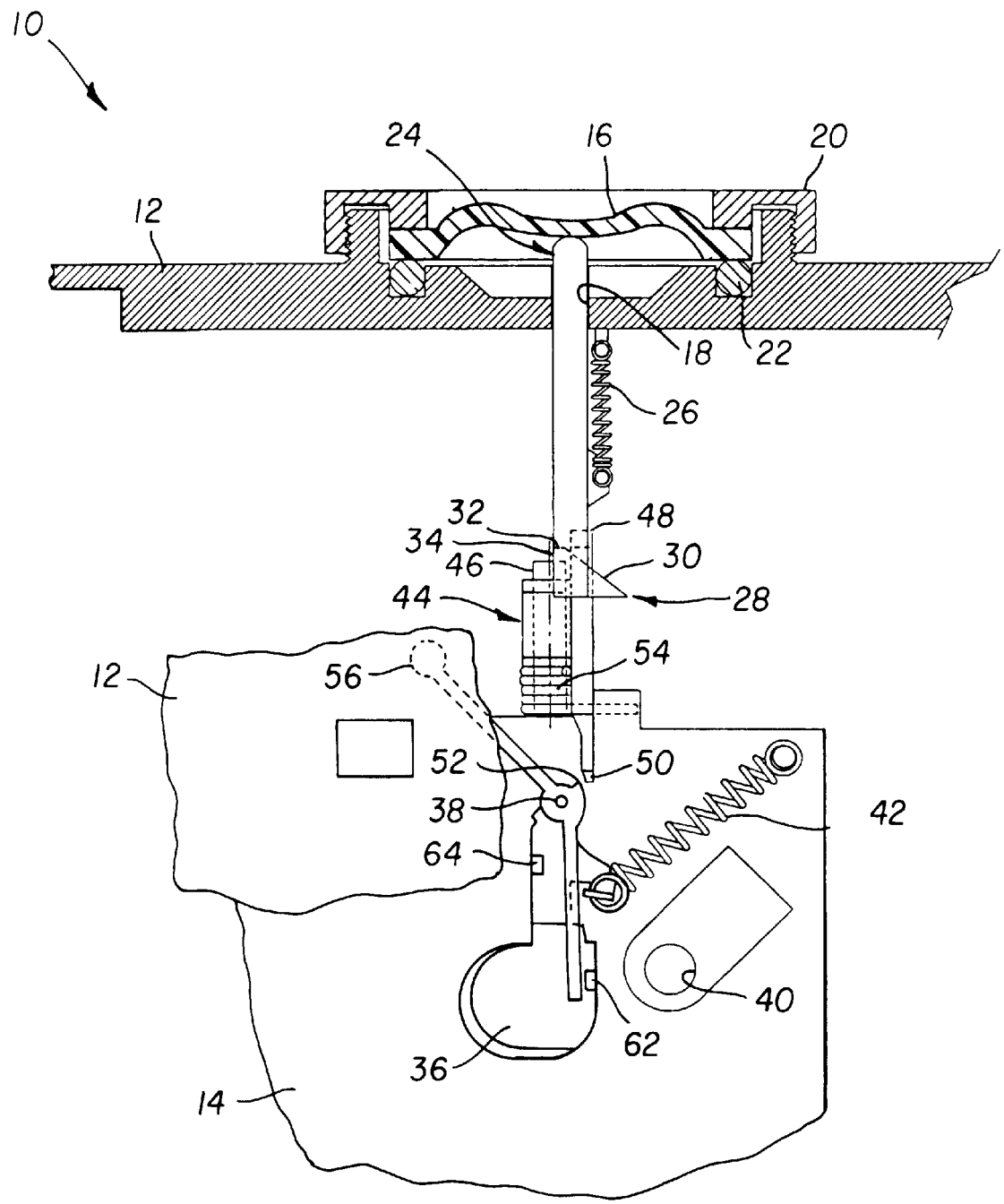
FIG. 3 is a front elevation view similar to FIG. 1, but in which the shutter release button is manually depressed to move the shutter blade open.
Figure 4:
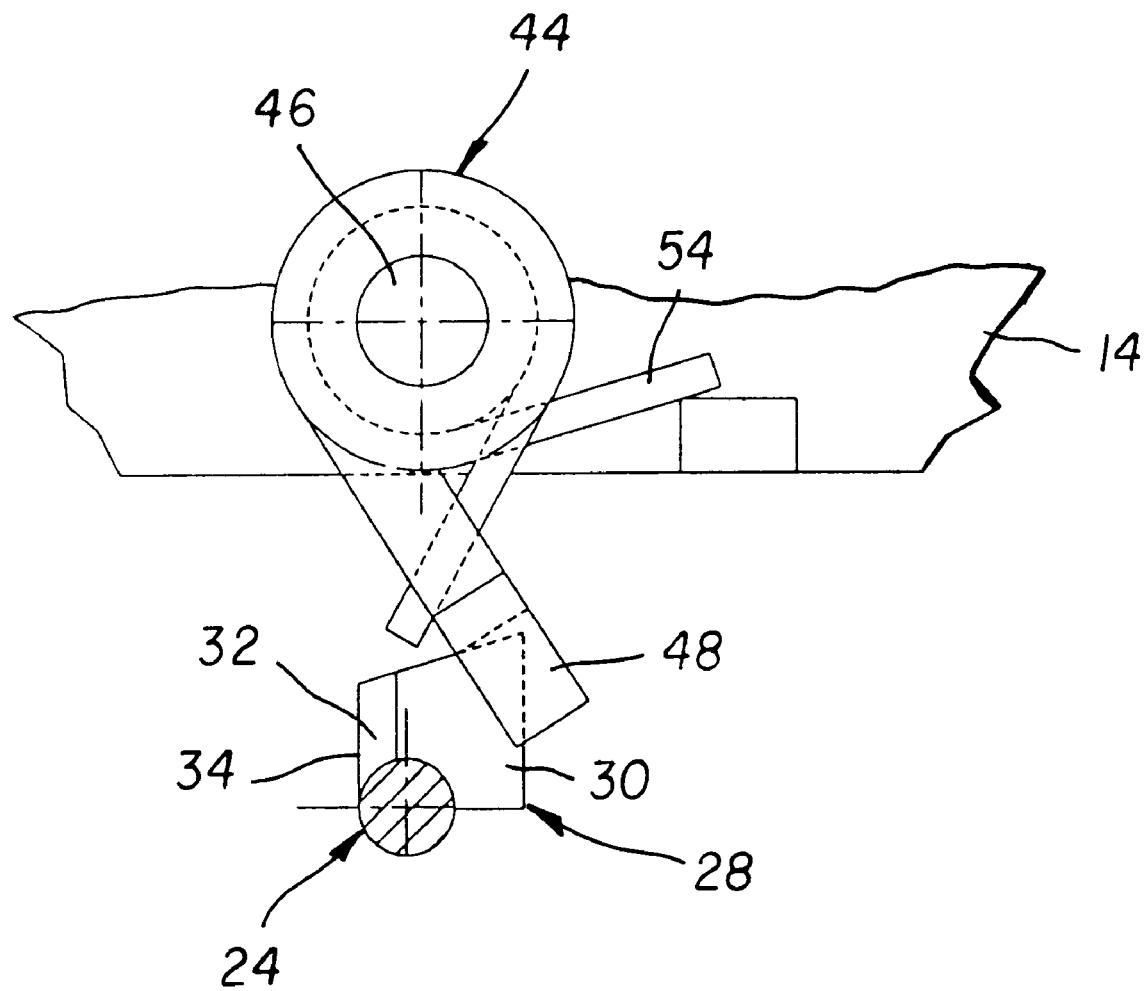
FIG. 4 is a top plan view of the actuator as seen in FIG. 3.
Figure 5:
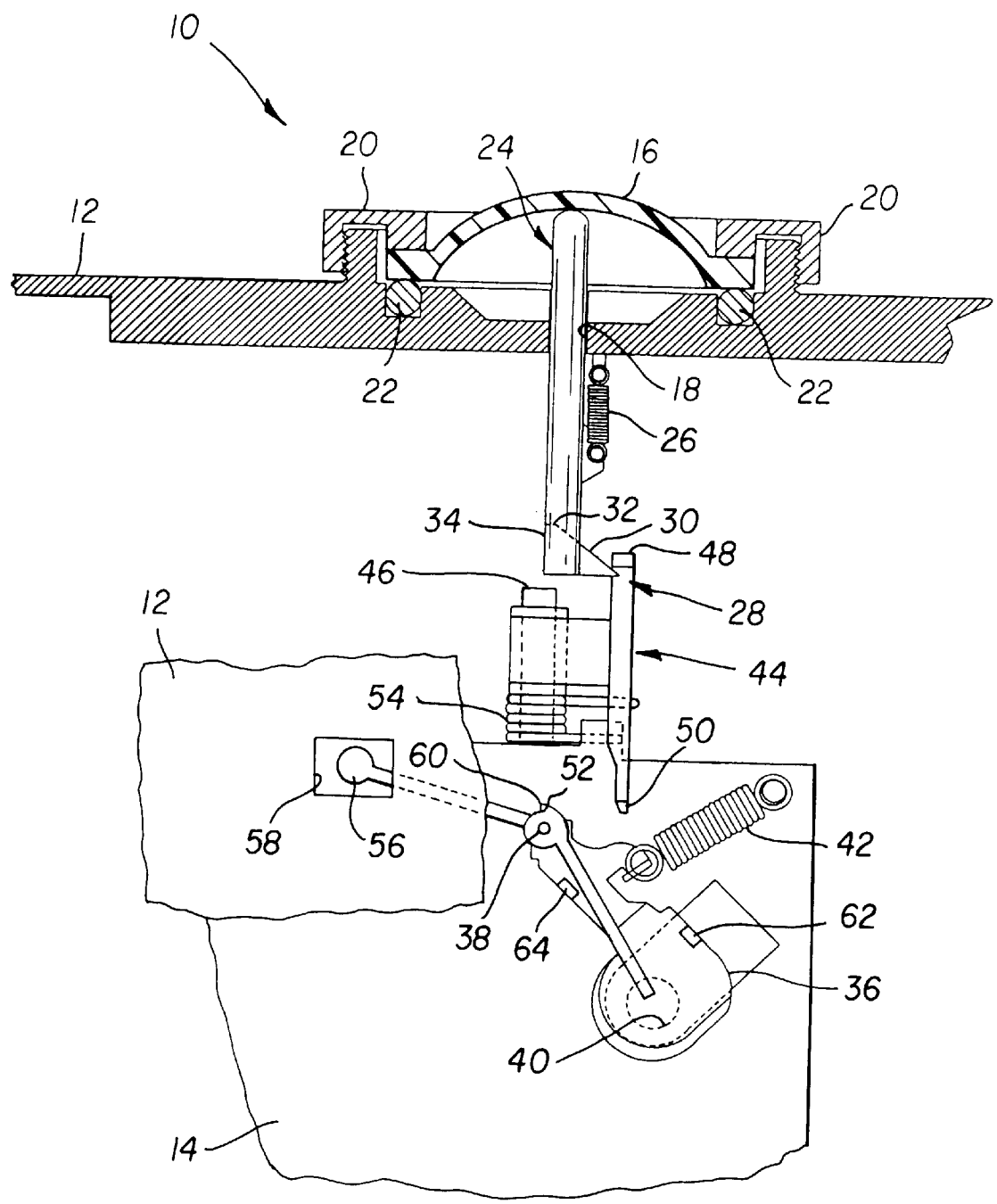
FIG. 5 is a front elevation view similar to FIG. 3, but in which the shutter blade is moved closed.

The shutter release button 16 is elastic to permit it to be manually depressed to initiate shutter opening. When the shutter release button 16 is manually depressed to the extent shown in FIG. 3, the plunger rod 24 is similarly lowered and the vertical retainer wall 34 on the end projection 28 of the plunger rod is lowered beyond the top end flange 48 on the actuator 44. Since the top end flange 48 on the actuator 44 is no longer positioned against the vertical retainer wall 34 on the end projection 28 of the plunger rod 24, the torsion spring 54 rotates the actuator 44 counter-clockwise in FIGS. 3–5 about the shaft 46. The top end flange 48 on the actuator 44 is thus first moved over the top flat 32 on the end projection 28 of the plunger rod 24 and then beyond the top flat to over the incline 30 on the end projection, and the bottom end flange 50 on the actuator, which is positioned against the protuberance 52 on the shutter blade 36 and against a similar-shaped protuberance 60 on the indicator 56 (located behind the protuberance 52 in FIG. 3), pivots the shutter blade clockwise in FIG. 3 about the pivot pin 38 to uncover the aperture 40 in order to expose the filmstrip (not shown) in the camera 10 and simultaneously pivots the indicator clockwise in FIG. 3 about the pivot pin. As can be appreciated from FIG. 3, the indicator 56 is pivoted clockwise first to and then from, i.e. past, the window 58. When the bottom end flange 50 on the actuator 44 clears the protuberances 52 and 60 on the shutter blade 36 and the indicator 56 as shown in FIG. 3, the shutter blade and the indicator may continue to pivot clockwise slightly further due to their inertia. A forward driver or tab 62 on the shutter blade 36 abuts the indicator 56 to ensure that the indicator continues to move with the shutter blade. However, the closing spring 42 pivots the shutter blade 46 counter-clockwise in FIG. 5 about the pivot pin 38 to re-cover the aperture 40. A reverse driver or tab 64 on the shutter blade 36 is moved against the indicator 56 to pivot the indicator counter-clockwise in FIG. 5 about the pivot pin 38. When the shutter blade 36 re-covers the aperture 40, as shown in FIG. 5, the indicator 56 is returned to the window 58. In FIG. 5, the torsion spring 54 has rotated the actuator 44 counter-clockwise slightly farther than in FIG. 3, but the top end flange 48 on the actuator 44 is not moved beyond the incline 30 on the end projection 28 of the plunger rod 24. At the same time, the return spring 26 begins to raise the plunger rod 24 upward to position the incline 30 on the end projection 28 of the plunger rod 24 against the top end flange 48 on the actuator 44. This is shown in FIG. 5.

Figure 1:
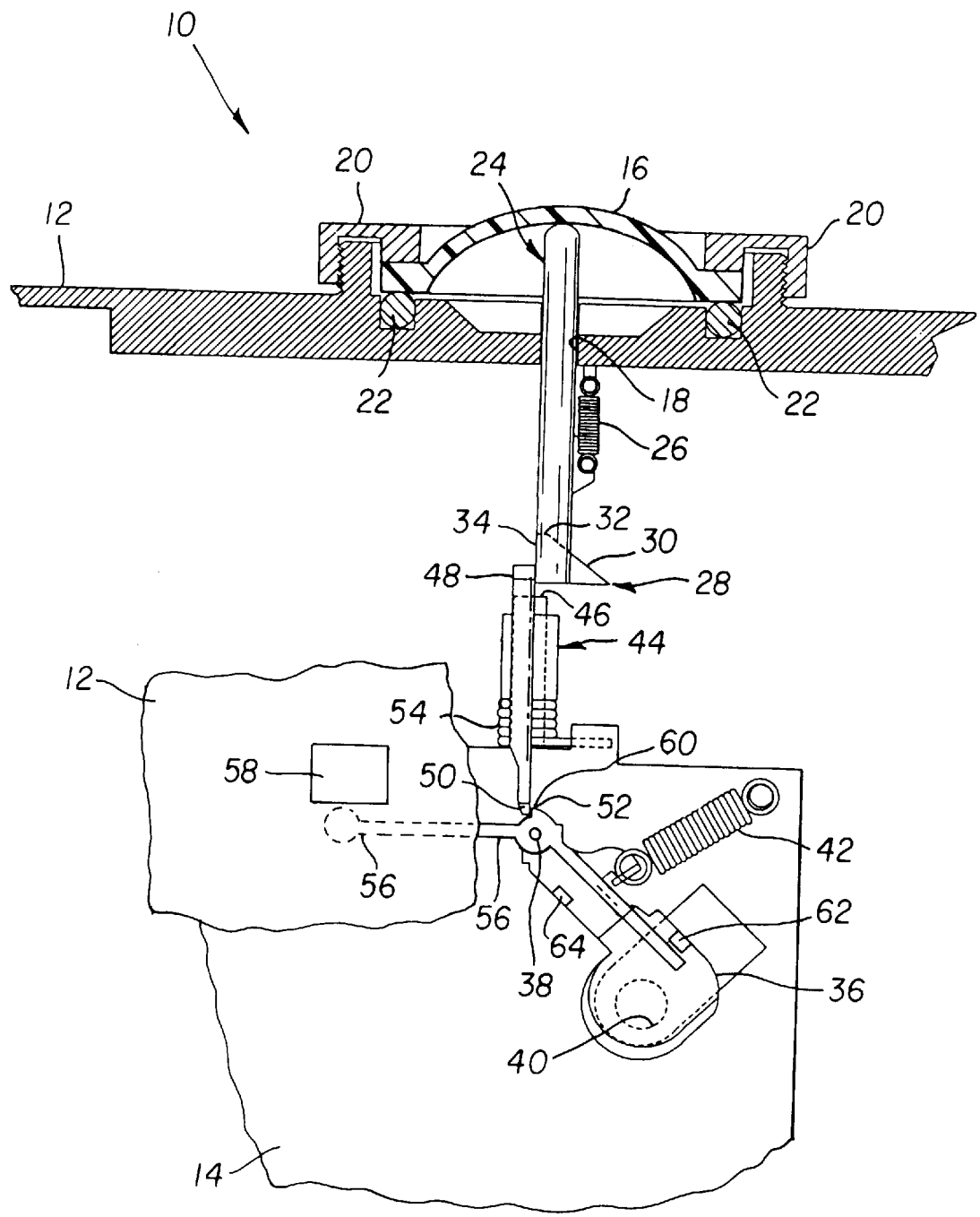
FIG. 1 is a front elevation view of a portion of a camera including a shutter release button manually depressible to initiate shutter opening, a shutter blade, an actuator for the shutter blade, and an indicator to provide a warning the shutter blade has been moved open without the shutter release button having been manually depressed such as when the camera is dropped or jarred, according to a preferred embodiment of the invention.
Figure 2:
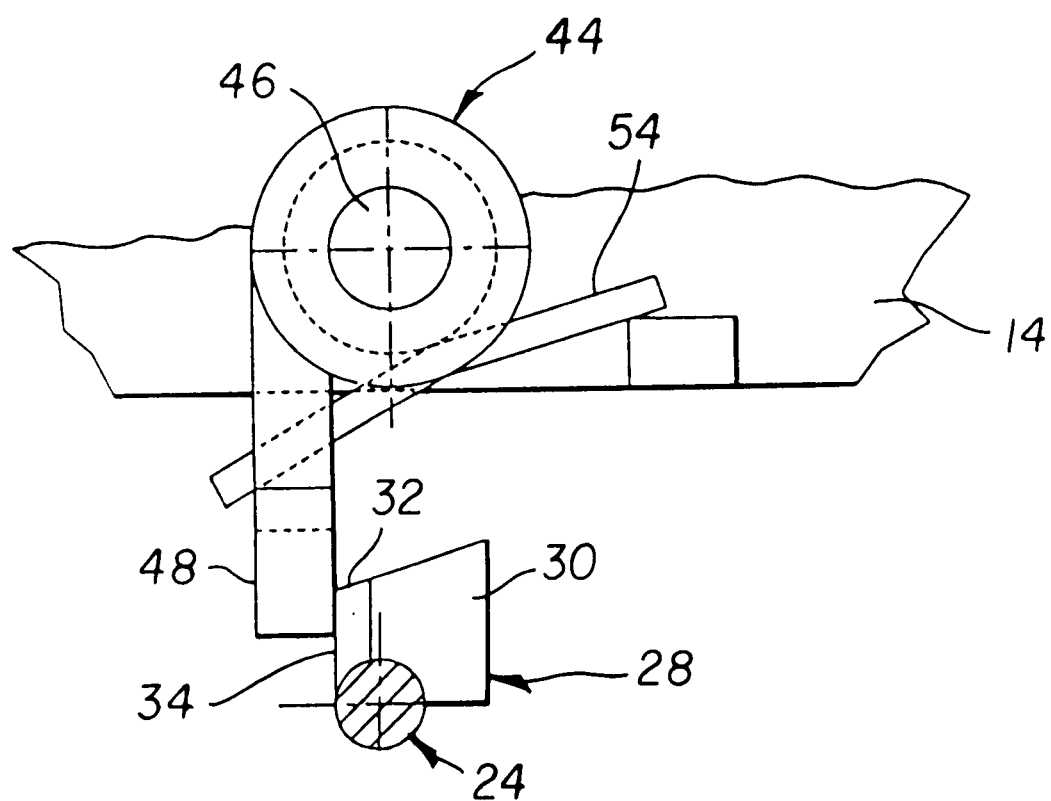
FIG. 2 is a top plan view of the actuator as seen in FIG. 1.
Figure 6:
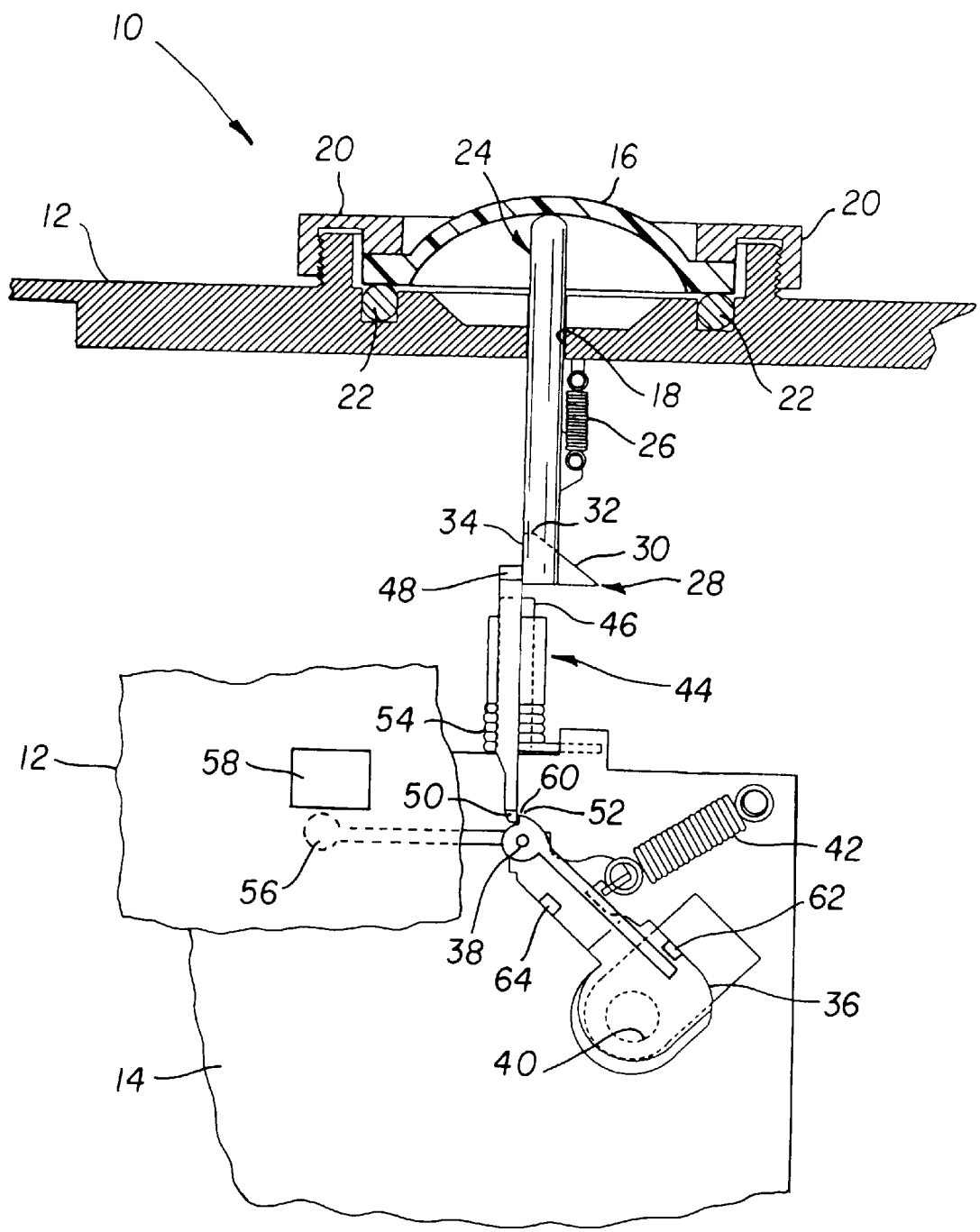
FIG. 6 is a front elevation view similar to FIG. 5, but in which the actuator is reset to an original position shown in FIG. 1.
Figure 7:
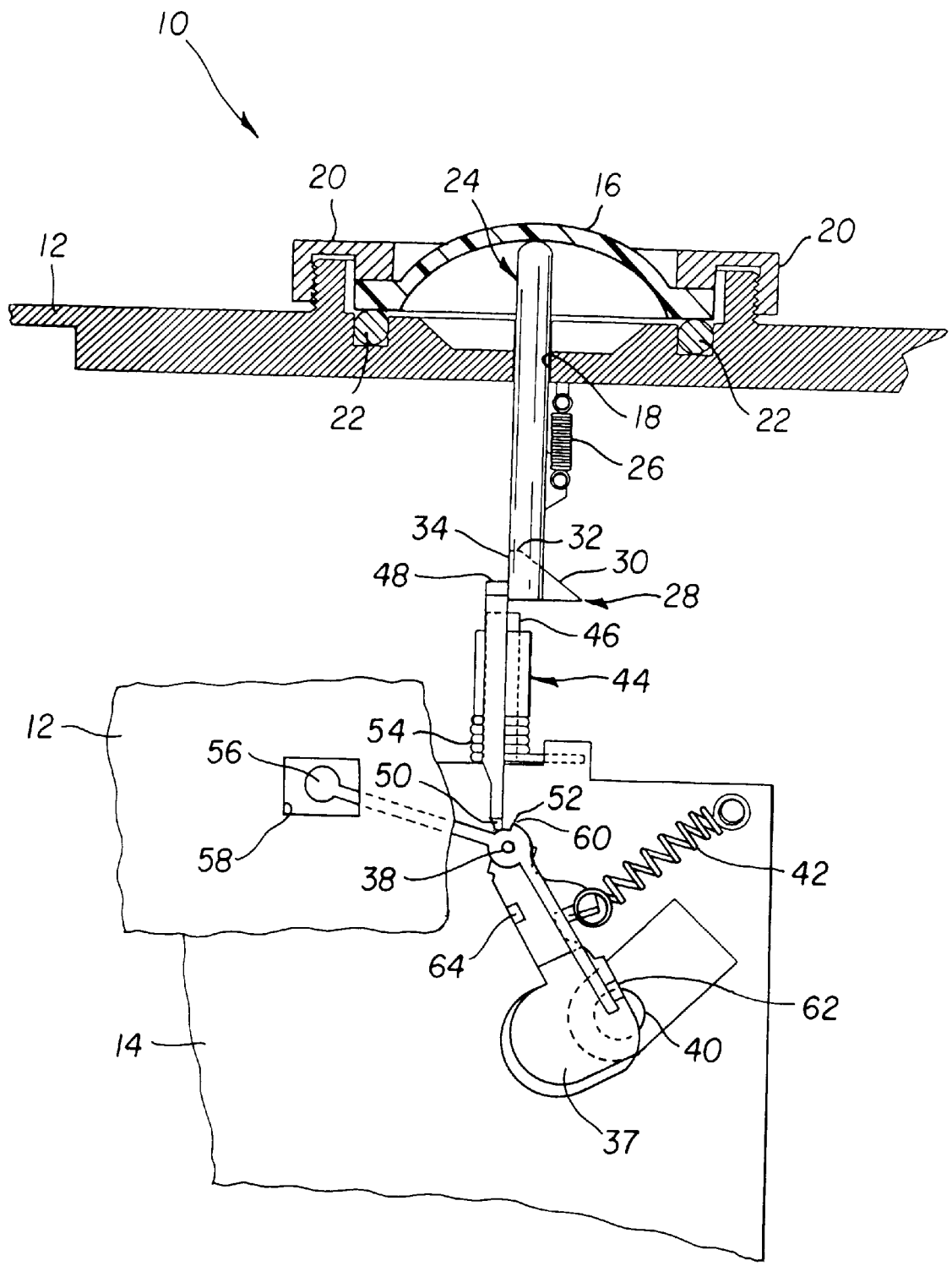
FIG. 7 is a front elevation view similar to FIG. 1, but in which shutter blade is moved open without the shutter release button first having been manually depressed.

A known re-cocking device (not shown) rotates the actuator 44 clockwise in FIG. 6 about the shaft 46 to an original position which is the same as in FIG. 1. The top end flange 48 on the actuator 44 is thus re-positioned against the vertical retainer wall 34 on the end projection 28 of the plunger rod 24, and the bottom end flange 50 on the actuator is thus re-positioned against the protuberance 60 on the shutter blade 36. Also, the actuator 44 is moved against the protuberance 60 on the indicator 58 to in turn pivot the indicator counter-clockwise in FIG. 6 from the window 58 to an original position removed from the window, which is the same as in FIG. 1. The protuberance 60 on the indicator 56 comes to rest behind the protuberance 52 on the shutter blade 36.

The shutter blade 36 is susceptible of being moved open accidentally such as when the camera is dropped or jarred, i.e. without the shutter release button 16 having been manually depressed as in FIG. 3. In this instance, the physical shock to the camera 10 can pivot the shutter blade 36 clockwise in FIG. 7 about the pivot pin 38 to at least partially uncover the aperture 40 in order to expose the filmstrip (not shown) in the camera 10 and simultaneously pivots the indicator 56 clockwise in FIG. 7 about the pivot pin to move the indicator at least to (and possibly beyond) the window 58. The indicator 56 is pivoted clockwise in FIG. 7 by means of the forward driver 62 on the shutter blade 36. The closing spring 42 then pivots the shutter blade 36 counter-clockwise in FIG. 8 about the pivot pin 38 to re-cover the aperture 40. If the indicator 56 has been pivoted clockwise in FIG. 7 beyond the window 58, the reverse driver 64 on the shutter blade 36 is moved against the indicator to pivot the indicator counter-clockwise in FIG. 8 about the pivot pin 38 to the window 58. Otherwise, the indicator 56 is already at the window 58. Consequently, a visible warning is provided that the shutter blade 36 has been accidentally opened.

When one is alerted that the shutter blade 36 has been accidentally opened, he or she must depress the shutter release button 16 to remove the indicator 56 from the window 58 as in FIG. 1. This should be done without aiming the camera 10 at a subject to take a picture.

The invention has been described with reference to a preferred embodiment. However, it will be appreciated that variations and modifications can be effected by a person of ordinary skill in the art without departing from the scope of the invention.

PARTS LIST 10. camera 10
12. front and top cover part
14. main body part
16. shutter release button
18. top opening
20. retaining ring
22. o-ring
24. plunger rod
26. return spring
28. end projection
30. incline or ramp
32. flat or plateau
34. vertical retainer wall
36. shutter blade
38. pivot pin
40. aperture
42. closing spring
44. actuator
46. support shaft
48. top end flange
50. bottom end flange
52. protuberance
54. torsion spring
56. indicator
58. front window
60. protuberance
62. forward driver
64. reverse driver

What is claimed is:

1. A camera comprising an aperture through which ambient light is passed to cause a film exposure, a shutter blade supported for opening movement to uncover said aperture to permit ambient light to pass through the aperture and for closing movement to re-cover said aperture and susceptible of being moved open accidentally such as when said camera is dropped or jarred, and a shutter release button manually depressible to initiate opening movement of said shutter blade, is characterized in that:

an indicator is activatable to provide a warning said shutter blade has been moved open without said shutter release button having been manually depressed, whereby the warning indicates said shutter blade has been moved open accidentally such as when said camera is dropped or jarred.

2. A camera as recited in claim 1, wherein said indicator is coupled with said shutter blade and supported for movement to provide the warning the shutter blade has been moved open without said shutter release button having been manually depressed.

3. A camera as recited in claim 2, wherein a window is positioned to view said indicator at said window, and said indicator is moved from said window when said shutter blade is moved open in response to said shutter release button being depressed and remains at said window to provide the warning when said shutter blade is moved open without said shutter release button having been manually depressed.

4. A camera as recited in claim 3, wherein an actuator is supported to move in one direction to move said shutter blade open only when said shutter release button is depressed and in a return direction to move said indicator from said window.

5. A camera as recited in claim 1, wherein a spring continuously urges said shutter blade to move closed.

6. A camera as recited in claim 5, wherein said shutter blade is supported to pivot open and closed.

7. A camera as recited in claim 1, wherein a pivot pin supports said shutter blade to pivot open and closed and supports said indicator for movement to provide the warning said shutter blade has been pivoted open without said shutter release button having been manually depressed.

8. A camera as recited in claim 7 wherein a window is positioned to view said indicator at said window, said shutter blade has one driver for moving said indicator to be spaced from said window when said shutter blade is pivoted open and another driver for returning said indicator to be at said window when said shutter blade is pivoted closed, and an actuator is supported to move in one direction to move said shutter blade open only when said shutter release button is depressed and in a return direction to move said indicator from said window.

* * * * *